(12) United States Patent
Goko et al.

(10) Patent No.: US 7,603,767 B2
(45) Date of Patent: Oct. 20, 2009

(54) WORKPIECE PICKING AND PLACING METHOD

(75) Inventors: Norio Goko, Kariya (JP); Atsushi Sakaida, Nagoya (JP); Toshihisa Taniguchi, Handa (JP); Yuji Tuduki, Handa (JP)

(73) Assignee: DENSO CORPORATION, Kariya (JP)

( * ) Notice: Subject to any disclaimer, the term of this patent is extended or adjusted under 35 U.S.C. 154(b) by 338 days.

(21) Appl. No.: 11/439,418

(22) Filed: May 23, 2006

(65) Prior Publication Data

US 2006/0284357 A1 Dec. 21, 2006

(30) Foreign Application Priority Data

May 24, 2005 (JP) ............................. 2005-151584

(51) Int. Cl.
*B23P 19/00* (2006.01)
(52) U.S. Cl. ............................. 29/743; 29/740; 29/833; 294/64.1
(58) Field of Classification Search ............... 29/729, 29/739–743, 832–834; 269/21–22, 3, 6, 269/95; 273/3; 294/64.1, 65.5; 901/40; 414/627, 752, 737; 361/212, 233–235
See application file for complete search history.

(56) References Cited

U.S. PATENT DOCUMENTS

| 5,189,785 | A | * | 3/1993 | Toyota Jidosha Kabushiki Kaisha et al. ............................ 29/809 |
| 6,000,122 | A | * | 12/1999 | Uchida et al. ................. 29/740 |
| 6,437,868 | B1 | * | 8/2002 | Coult et al. .................. 356/630 |
| 6,663,092 | B2 | * | 12/2003 | Kashiwazaki et al. ......... 269/21 |
| 6,827,344 | B1 | * | 12/2004 | Ristau ......................... 269/21 |
| 6,851,733 | B2 | * | 2/2005 | Mori et al. ................. 294/64.1 |
| 7,059,045 | B2 | * | 6/2006 | Lu et al. ....................... 29/840 |
| 7,175,504 | B2 | * | 2/2007 | Izumi et al. .................... 451/5 |
| 2006/0284357 | A1 | * | 12/2006 | Goko et al. .................... 269/21 |

FOREIGN PATENT DOCUMENTS

JP 64-058486 3/1989

* cited by examiner

*Primary Examiner*—Minh Trinh
(74) *Attorney, Agent, or Firm*—Harness, Dickey & Pierce, PLC

(57) ABSTRACT

A workpiece holding method and holding system able to shorten the workpiece attachment/detachment time, wherein pressurized air is circulated through a nozzle of an ejector unit of a chuck at all times to make the inside of a suction chamber a negative pressure before chucking a workpiece, completion of chucking is detected based on a pressure value detected by a pressure sensor after chucking the workpiece, and the workpiece is unchucked by having a valve close an exhaust port to raise the pressure inside an exhaust chamber and introducing pressurized air from the ejector unit to the suction chamber.

10 Claims, 11 Drawing Sheets

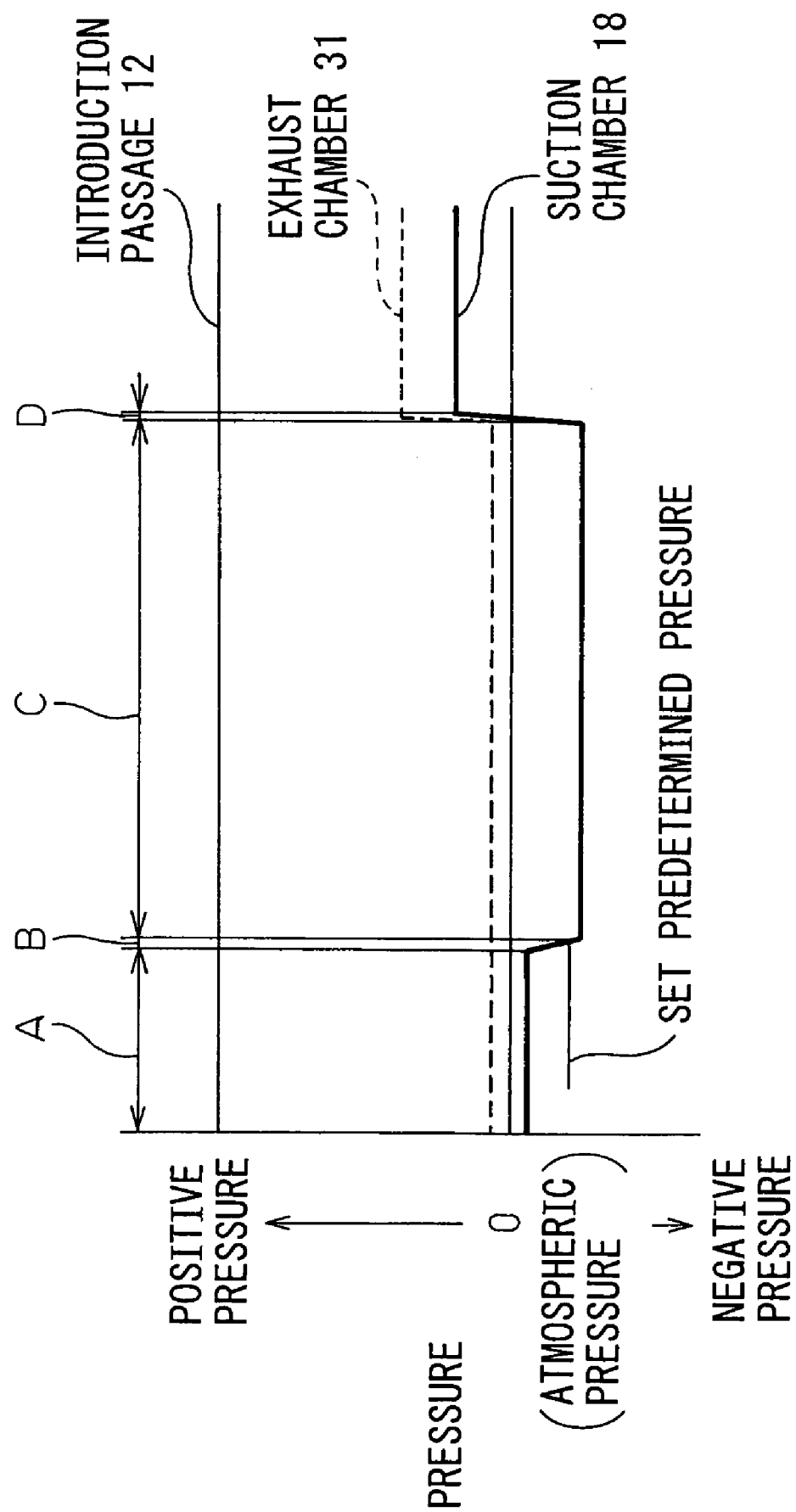

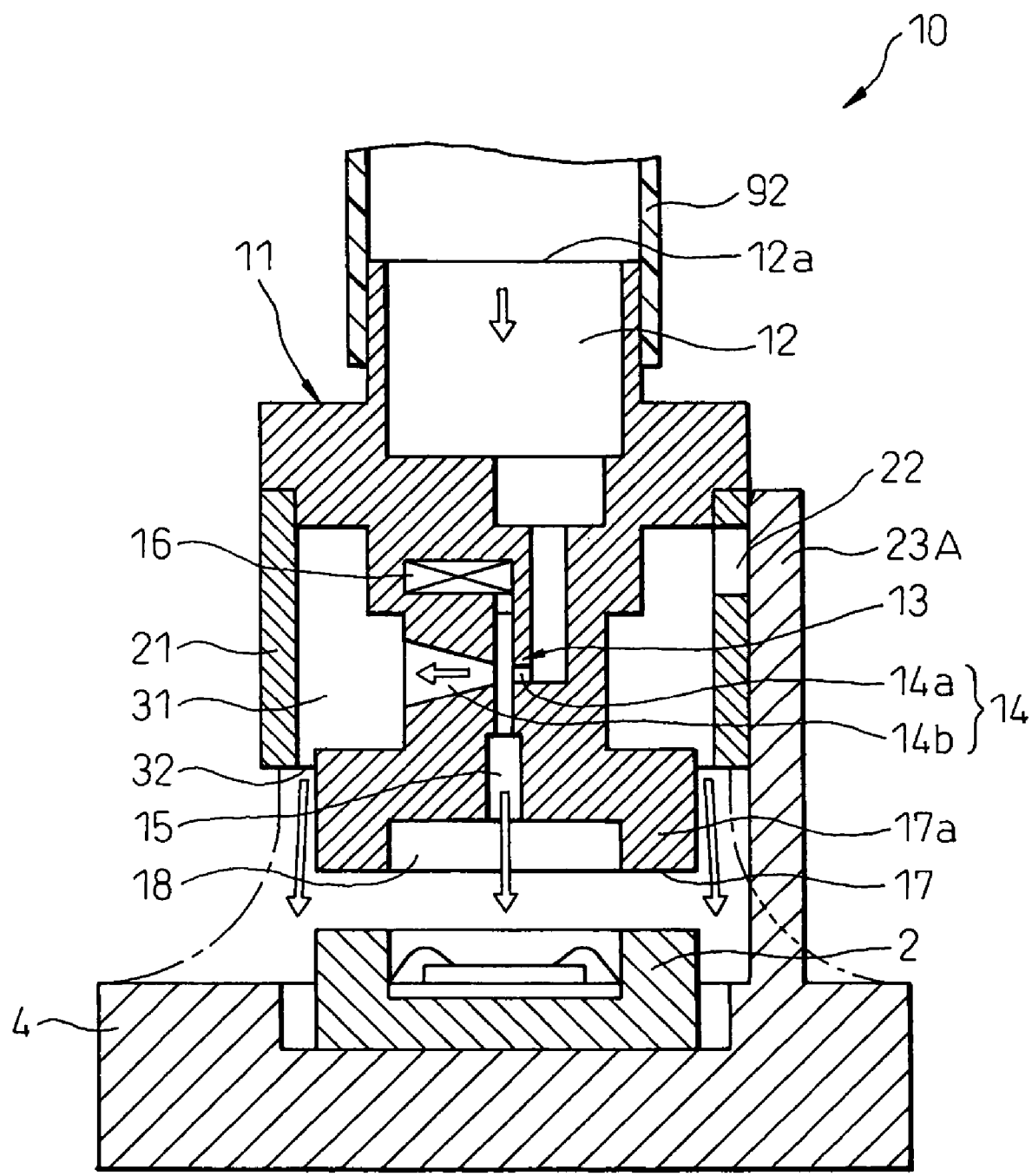

WORKPIECE PICKING AND PLACING METHOD

BACKGROUND OF THE INVENTION

1. Field of the Invention

The present invention relates to a method of using a suction type chuck to hold a workpiece and a holding system of the same.

2. Description of the Related Art

As related art, there is the workpiece holding system disclosed in Japanese Patent Publication (A) No. 64-58486. This workpiece holding system is a suction type chuck system provided with a nozzle for circulating pressurized gas, a reduced pressure chamber provided at a suction plate for chucking (holding by suction) a workpiece comprised of a wafer, and a communication passage communicating the reduced pressure chamber and nozzle.

When chucking a wafer, first, the suction plate is placed on the wafer to form a closed reduced pressure chamber. Next, the nozzle is fed pressurized gas to suck out the gas in the communication passage. Due to this, the reduced pressure chamber connected with the communication passage is reduced in pressure and the wafer is given suction and chucked.

Further, when unchucking the wafer, the supply of pressurized gas to the nozzle is stopped and the atmosphere in the reduced pressure chamber is made equal to the atmospheric pressure. Due to this, the suction on the wafer is released and the wafer is unchucked.

However, in the above holding method of the related art, when chucking a workpiece, the suction chamber is arranged to contact the workpiece, then the inside of the suction chamber is reduced in pressure. Further, when unchucking the workpiece, the atmosphere flows in from the nozzle, no longer supplied with pressurized gas, through the communication passage to the inside of the suction chamber, whereby the negative pressure state inside the suction chamber is released.

Therefore, there were the problems that attachment and detachment (chucking and unchucking) of the workpiece required a relatively long time and it was difficult to reduce the attachment/detachment time as strongly demanded.

SUMMARY OF THE INVENTION

An object of the present invention is to provide workpiece holding method and holding system enabling shortening of the attachment/detachment time of a workpiece.

To achieve this object, according to a first aspect of the present invention, there is provided a workpiece holding method comprising a chuck step of chucking a workpiece before a workpiece operating step for performing some operation on the workpiece and an unchuck step of unchucking the workpiece after the workpiece operating step, the chuck step simultaneously performing an arranging step of arranging a suction chamber so as to contact the workpiece and a negative pressure forming step of circulating pressurized gas through a nozzle to suck out gas inside the suction chamber communicated with the nozzle and making the inside of the suction chamber a negative pressure so as to apply suction to the workpiece so as to thereby chuck the workpiece, the unchuck step lifting the negative pressure state of the inside of the suction chamber and unchucking the workpiece, the negative pressure forming step being started before the arranging step.

According to this, the negative pressure forming step of making the inside of the suction chamber a negative pressure in state is performed before the chuck step is started. Therefore, if the arranging step of arranging the suction chamber to contact the workpiece is performed and the chuck step is started, the suction chamber can quickly apply suction to the workpiece and hold the workpiece.

In this way, the time required for the chuck step can be shortened and the attachment/detachment time of the workpiece can be shortened.

Further, according to a second aspect of the invention, there is provided the workpiece holding method of the first aspect of the invention further comprising shifting to the workpiece operating step when the negative pressure inside the suction chamber falls below a predetermined pressure in the chuck step.

According to this, when the inside of the suction chamber reaches a predetermined pressure able to reliably hold the workpiece, the workpiece operating step can be quickly shifted to. That is, the workpiece operating step can be shifted to without continuing the chuck step for more than necessary.

In this way, the time required for the chuck step can be shortened and the attachment/detachment time of the workpiece can be shortened.

Further, according to a third aspect of the invention, there is provided the workpiece holding method of the first aspect of the invention wherein the unchuck step pressurizes the inside of the suction chamber to atmospheric pressure or more.

According to this, the negative pressure state inside of the suction chamber can be quickly lifted by pressurization and the work unchucked. Therefore, the time required for the unchuck step can be shortened and the attachment/detachment time of the workpiece can be shortened.

Further, according to a fourth aspect of the invention, there is provided a workpiece holding method comprising a chuck step of chucking a workpiece before a workpiece operating step for performing some operation on the workpiece and an unchuck step of unchucking the workpiece after the workpiece operating step, the chuck step simultaneously performing an arranging step of arranging a suction chamber so as to contact the workpiece and a negative pressure forming step of circulating pressurized gas through a nozzle to suck out gas inside the suction chamber communicated with the nozzle and making the inside of the suction chamber a negative pressure so as to apply suction to the workpiece so as to thereby chuck the workpiece, the unchuck step lifting the negative pressure state of the inside of the suction chamber and unchucking the workpiece, the workpiece operating step being shifted to when the negative pressure inside the suction chamber falls below a predetermined pressure in the chuck step.

According to this, when the inside of the suction chamber reaches a predetermined pressure able to reliably hold the workpiece, the workpiece operating step can be quickly shifted to. That is, the workpiece operating step can be shifted to without continuing the chuck step for more than necessary.

In this way, the time required for the chuck step can be shortened and the attachment/detachment time of the workpiece can be shortened.

Further, according to a fifth aspect of the invention, there is provided the workpiece holding method of the fourth aspect of the invention wherein the unchuck step pressurizes the inside of the suction chamber to atmospheric pressure or more.

According to this, the negative pressure state inside of the suction chamber can be quickly lifted by pressurization and the workpiece unchucked. Therefore, the time required for the unchuck step can be shortened and the attachment/detachment time of the workpiece can be shortened.

Further, according to a sixth aspect of the invention, there is provided a workpiece holding method comprising a chuck step of chucking a workpiece before a workpiece operating step for performing some operation on the workpiece and an unchuck step of unchucking the workpiece after the workpiece operating step, the chuck step simultaneously performing an arranging step of arranging a suction chamber so as to contact the workpiece and a negative pressure forming step of circulating pressurized gas through a nozzle to suck out gas inside the suction chamber communicated with the nozzle and making the inside of the suction chamber a negative pressure so as to apply suction to the workpiece so as to thereby chuck the workpiece, the unchuck step lifting the negative pressure state of the inside of the suction chamber and unchucking the workpiece, the unchuck step pressurizing the inside of the suction chamber to atmospheric pressure or more.

According to this, the negative pressure state inside of the suction chamber can be quickly lifted by pressurization and the workpiece unchucked. Therefore, the time required for the unchuck step can be shortened and the attachment/detachment time of the workpiece can be shortened.

Further, according to a seventh aspect of the invention, there is provided the workpiece holding method of the third aspect of the invention wherein the unchuck step introduces the pressurized gas to the inside of the suction chamber to pressurize the inside of the suction chamber to atmospheric pressure or more.

According to this, it is possible to utilize the pressurized gas meant for circulation in the nozzle for pressurizing the inside of the suction chamber. Therefore, there is no need to introduce another high pressure gas for pressurizing the inside of the suction chamber.

Further, according to an eighth aspect of the invention, there is provided the workpiece holding method of the seventh aspect of the invention wherein the unchuck step makes a pressure of the pressurized gas at an upstream side from the nozzle and a pressure of the pressurized gas at a downstream side from the nozzle approach each other and introduces the pressurized gas from the nozzle to the inside of the suction chamber.

According to this, by just making the pressures at the upstream side and downstream side of the nozzle approach each other (by just reducing the pressure difference), the pressurized gas can be easily introduced from the nozzle to the inside of the suction chamber.

Further, according to a ninth aspect of the invention, there is provided the workpiece holding method of the eighth aspect of the invention wherein the unchuck step raises the pressure of the inside of an exhaust chamber of the pressurized gas provided at a downstream side of the nozzle so as to make the pressure of the pressurized gas at the upstream side from the nozzle and the pressure of the pressurized gas at the downstream side from the nozzle approach each other.

Further, according to a 10th aspect of the invention, there is provided the workpiece holding method of the ninth aspect of the invention wherein the unchuck step reduces a cross-sectional area of an exhaust path of the pressurized gas from the exhaust chamber to the outside so as to raise the pressure at the inside of the exhaust chamber.

Further, according to an 11th aspect of the invention, there is provided the workpiece holding method of the first aspect of the invention wherein the pressurized gas is cleaned gas, and the chuck step ejects the pressurized gas after passing through the nozzle so as to surround the circumference of the workpiece.

According to this, when chucking a workpiece by the suction action of pressurized gas passing through the nozzle in the chuck step, cleaned pressurized gas passing through the nozzle is ejected so as to surround the workpiece.

Therefore, the chucked workpiece is surrounded by cleaned gas and foreign matter can be prevented from depositing on the workpiece.

Further, according to a 12th aspect of the invention, there is provided the workpiece holding method of the 11th aspect of the invention, further comprising, before starting the chuck step, returning the ejected pressurized gas through the suction chamber to the nozzle.

According to this, the ejected cleaned gas is returned from the suction chamber to the nozzle before the workpiece is chucked, so the cleanliness of the ejected gas can be maintained.

Further, according to a 13th aspect of the invention, there is provided the workpiece holding method of the 11th aspect of the invention, further comprising, after ending the unchuck step, returning the ejected pressurized gas through the suction chamber to the nozzle.

According to this, the ejected cleaned gas is returned from the suction chamber to the nozzle after the workpiece is unchucked, so the cleanliness of the ejected gas can be maintained.

Further, according to a 14th aspect of the invention, there is provided a workpiece holding system provided with a nozzle for ejecting pressurized gas, a suction chamber communicating with the inside of the nozzle and arranged so as to contact the workpiece when chucking the workpiece, and a pressurized gas feeding means for feeding the pressurized gas to the nozzle before chucking the workpiece.

According to this, it is possible to work the workpiece holding method of the first aspect of the present invention. Therefore, when arranging the suction chamber so as to contact the workpiece, the suction chamber can quickly apply suction to the workpiece and hold the workpiece. In this way, it is possible to shorten the attachment/detachment time of the workpiece.

Further, according to a 15th aspect of the invention, there is provided the workpiece holding system of the 14th aspect of the invention, further provided with a pressure detecting means for detecting pressure in the suction chamber.

According to this, it is possible to work the workpiece holding method of the second aspect of the present invention. Therefore, when a predetermined pressure inside the suction chamber enabling the workpiece to be reliably held is detected by the pressure detecting means, the next step can be quickly shifted to. In this way, it is possible to shorten the attachment/detachment time of the workpiece.

Further, according to a 16th aspect of the invention, there is provided the workpiece holding system of the 14th aspect of the invention, further provided with pressurizing means for pressurizing the inside of the suction chamber to atmospheric pressure or more.

According to this, it is possible to work the workpiece holding method of the third aspect of the present invention. Therefore, it is possible to quickly lift the negative pressure state inside of the suction chamber by the pressurizing means and thereby unchuck the workpiece. Therefore, it is possible to shorten the attachment/detachment time of the workpiece.

Further, according to a 17th aspect of the invention, there is provided a workpiece holding system provided with a nozzle for ejecting pressurized gas, a suction chamber communicating with the inside of the nozzle and arranged so as to contact the workpiece when chucking the workpiece, a pressurized gas feeding means for feeding the pressurized gas to the nozzle, and a pressure detecting means for detecting a pressure of the inside of the suction chamber.

According to this, it is possible to work the workpiece holding method of the fourth aspect of the present invention. Therefore, when a predetermined pressure inside the suction chamber enabling the workpiece to be reliably held is detected by the pressure detecting means, the next step can be quickly shifted to. In this way, it is possible to shorten the attachment/detachment time of the workpiece.

Further, according to an 18th aspect of the invention, there is provided the workpiece holding system of the 17th aspect of the invention, further provided with pressurizing means for pressurizing the inside of the suction chamber to atmospheric pressure or more.

According to this, it is possible to work the workpiece holding method of the fifth aspect of the present invention. Therefore, it is possible to quickly lift the negative pressure state inside of the suction chamber by the pressurizing means and thereby unchuck the workpiece. Therefore, it is possible to shorten the attachment/detachment time of the workpiece.

Further, according to a 19th aspect of the invention, there is provided a workpiece holding system provided with a nozzle for ejecting pressurized gas, a suction chamber communicating with the inside of the nozzle and arranged so as to contact the workpiece when chucking the workpiece, a pressurized gas feeding means for feeding the pressurized gas to the nozzle, and pressurizing means for pressurizing the inside of the suction chamber to atmospheric pressure or more.

According to this, it is possible to work the workpiece holding method of the sixth aspect of the present invention. Therefore, it is possible to quickly lift the negative pressure state inside of the suction chamber by the pressurizing means and thereby unchuck the workpiece. Therefore, it is possible to shorten the attachment/detachment time of the workpiece.

Further, according to a 20th aspect of the invention, there is provided the workpiece holding system of the 16th aspect of the invention, wherein the pressurizing means are pressurized gas introducing means for introducing the pressurized gas to the inside of the suction chamber.

According to this, it is possible to work the workpiece holding method of the seventh aspect of the present invention. Therefore, the pressurized gas introducing means can introduce the pressurized gas meant for circulation in the nozzle for pressurizing the inside of the suction chamber. That is, there is no need to introduce another high pressure gas for pressurizing the inside of the suction chamber.

Further, according to a 21st aspect of the invention, there is provided the workpiece holding system of the 20th aspect of the invention, wherein the pressurized gas introducing means have pressure approaching means for making a pressure of the pressurized gas at an upstream side from the nozzle and a pressure of the pressurized gas at a downstream side from the nozzle approach each other.

According to this, it is possible to work the workpiece holding method of the eighth aspect of the present invention. Therefore, the pressure approaching means can just make the pressures at the upstream side and downstream side of the nozzle approach each other so as to easily introduce the pressurized gas from the nozzle to the inside of the suction chamber.

Further, according to a 22nd aspect of the invention, there is provided the workpiece holding system of the 21st aspect of the invention, further provided with an exhaust chamber provided at a downstream side of the nozzle and to which the pressurized gas passing through the nozzle is exhausted, the pressure approaching means being pressure raising means for raising a pressure in the exhaust chamber.

According to this, it is possible to work the workpiece holding method of the ninth aspect of the present invention. Therefore, the pressure raising means can raise the pressure of the pressurized gas inside of the exhaust chamber provided at the downstream side of the nozzle to easily make the pressure of the pressurized gas at the upstream side from the nozzle and the pressure of the pressurized gas at the downstream side from the nozzle approach each other.

Further, according to a 23rd aspect of the invention, there is provided the workpiece holding system of the 22nd aspect of the invention, further provided with an exhaust path cross-sectional area adjusting means for adjusting a cross-sectional area of an exhaust path of the pressurized gas from the exhaust chamber to the outside, the exhaust path cross-sectional area adjusting means reducing the exhaust path cross-sectional area so as to raise the pressure at the inside of the exhaust chamber.

According to this, it is possible to work the workpiece holding method of the 10th aspect of the present invention. That is, the exhaust path cross-sectional area adjusting means can reduce a cross-sectional area of an exhaust path of the pressurized gas from the exhaust chamber to the outside so as to easily raise the pressure at the inside of the exhaust chamber.

Further, according to a 24th aspect of the invention, there is provided the workpiece holding system of the 14th aspect of the invention, wherein the pressurized gas is cleaned gas, and the system is further provided with a ring-shaped eject port opening to the circumference of the suction chamber and ejecting the pressurized gas after passing through the nozzle so as to surround the workpiece.

According to this, it is possible to work the workpiece holding method of the 11th aspect of the present invention. Therefore, when chucking a workpiece by the suction action of pressurized gas passing through the nozzle, cleaned pressurized gas passing through the nozzle is ejected from the ring-shaped eject port so as to surround the workpiece. In this way, the chucked workpiece is surrounded by cleaned gas and foreign matter can be prevented from depositing on the workpiece.

Further, according to a 25th aspect of the invention, there is provided the workpiece holding system of the 24th aspect of the invention, wherein the suction chamber and the eject port are arranged so that the pressurized air ejected from the eject port flows to the suction chamber when the workpiece is separated from the suction chamber.

According to this, it is possible to work the workpiece holding method of the 12th aspect of the present invention. Therefore, the cleaned gas ejected from the eject port is returned from the suction chamber to the nozzle when the workpiece is not chucked, so the cleanliness of the gas ejected from the eject port can be maintained.

BRIEF DESCRIPTION OF THE DRAWINGS

The present invention may be more fully understood from the description of the preferred embodiments of the invention set forth below together with the accompanying drawings, in which:

FIGS. 1A and 1B are views showing the schematic configuration of a workpiece holding system comprised of a suction type chuck in an embodiment to which the present invention is applied, wherein FIG. 1A is a longitudinal cross-sectional view and FIG. 1B is a bottom view;

FIG. 7A is a graph showing pressure changes of different parts of the chuck of an embodiment, while

FIG. 8 is a view of the unchuck step in another embodiment;

DESCRIPTION OF THE PREFERRED EMBODIMENTS

Preferred embodiments of the present invention will be described in detail below while referring to the attached figures.

Figure 1A:
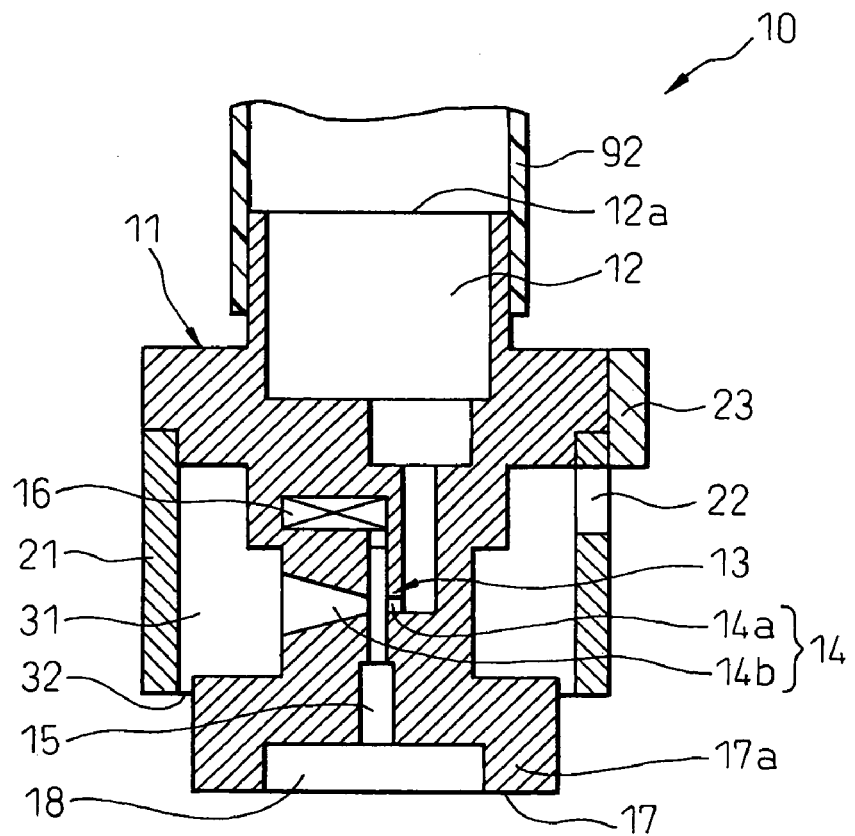
Figure 1B:
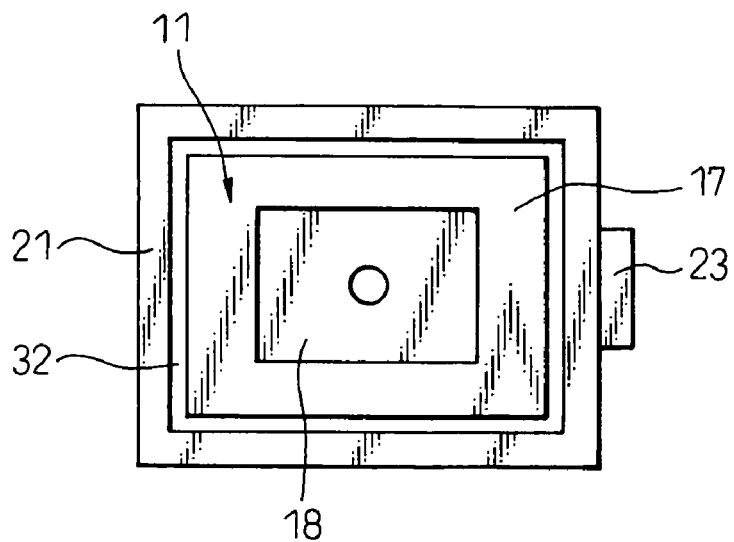
Figure 2:
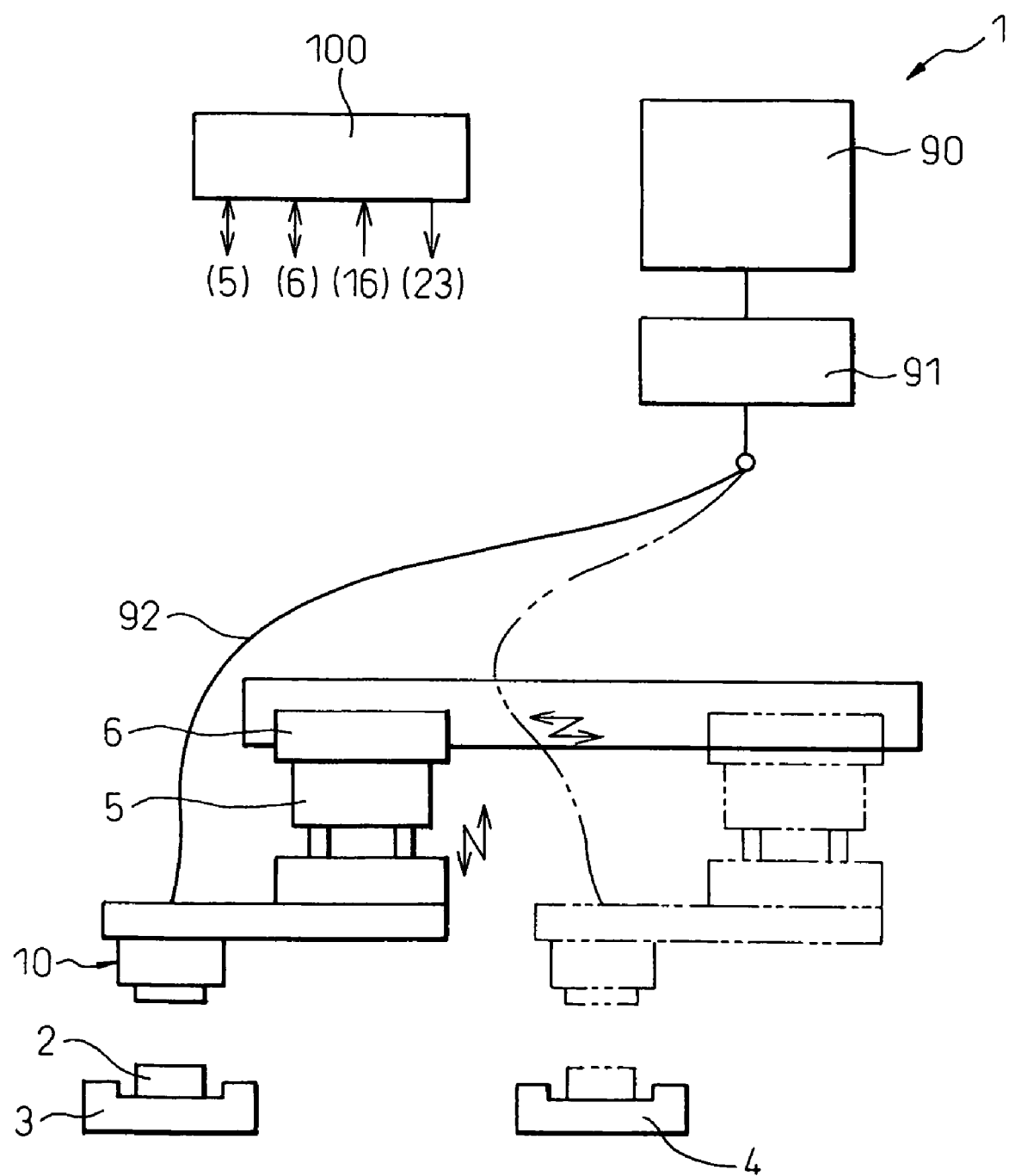
FIG. 2 is a schematic view of the configuration of a workpiece transporting system utilizing a chuck.

FIGS. 1A and 1B are views showing the schematic configuration of a workpiece holding system 1 comprised of a suction type chuck 10 in an embodiment to which the present invention is applied, wherein FIG. 1A is a longitudinal cross-sectional view and FIG. 1B is a bottom view. Further, FIG. 2 is a schematic view of the configuration of a workpiece transporting system 1 utilizing a chuck 10.

As shown in FIG. 1A, the chuck 10 of the present embodiment is comprised of a main part formed by a block member 11 and a cover 21 arranged at the outer circumference of the block member 11.

At the inside of the block member 11 is provided an introduction passage 12 for introducing pressurized gas (in this embodiment, pressurized air) from a later explained pressurized gas feeding means (see compressor 90 of FIG. 2). An introduction port 12a at an upstream end of the introduction passage 12 opens at a top face of the block member 11. A conduit 92 is connected for guiding the pressurized gas.

At the substantial center of the block member 11 is formed a nozzle 14, comprised of a primary nozzle comprised of an accelerating nozzle 14a and a secondary nozzle 14b, in the illustrated left-right direction. The accelerating nozzle 14a is connected at its upstream end to the downstream end of the introduction passage 12 and is formed smaller in cross-sectional area than the introduction passage 12.

Further, the secondary nozzle 14b is formed along substantially the same center axis as the accelerating nozzle 14a and is formed so that the diameter of the passage cross-section continuously increases from the upstream side (accelerating nozzle 14a side in illustrated right direction) toward the downstream side.

The bottom face of the block member 11 forms the chuck face 17 for chucking a workpiece. The chuck face 17 is formed with a recessed suction chamber 18 surrounded by a ring-shaped projection 17a. This suction chamber 18 and nozzle 14 (location between accelerating nozzle 14a and secondary nozzle 14b) are communicated by a communication passage 15.

The nozzle 14 comprised of the accelerating nozzle 14a and secondary nozzle 14b. The communicating passage 15 connecting the accelerating nozzle 14a and secondary nozzle 14b form an ejector unit (ejector mechanism) 14. The ejector unit 14 sucks in the gas in the communication passage 15 by the high speed flow of gas passing through the nozzle 14.

At the illustrated top end of the communication passage 15 (end at opposite side from suction chamber 18 side) is arranged a pressure detecting means comprised of a pressure sensor 16 for detecting the pressure in the suction chamber 18 through the communication passage 15.

The pressure sensor 16 of the present embodiment is a small sized semiconductor pressure sensor and is embedded in the block member 11. Further, this pressure sensor 16 is designed to output the pressure information in the suction chamber 18 to a later explained control system 100.

At the outer circumference of the block member 11 is provided a cylindrical cover 21 connected at the top end to the block member 11.

The block member 11 is formed with a constricted part (circumferential recess) across its entire circumference at the approximate center in the illustrated vertical direction. The downstream end of the secondary nozzle 14b of the nozzle 14 opens at this constricted part. That is, a circumferential space is formed between the block member 11 and cover 21. This space forms an exhaust chamber 31 of the gas discharged from the nozzle 14.

At the illustrated downward side of the exhaust chamber 31, the block member 11 and the cover 21 are separated so as to form a clearance part. This clearance part forms an eject port 32 of the gas from the exhaust chamber 21 to the outside.

As shown in FIG. 1B, the block member 11 chuck face 17 is formed to a rectangular shape of substantially the same dimensions as the shape of the workpiece 2 of the present embodiment (see FIG. 2). A cover 21 forms a rectangular shape one size larger than the chuck face 17. Due to this, the eject port 32 is also formed into a rectangular ring shape. The gas is ejected along the outer circumference of the workpiece 2 when chucking the workpiece 2 to the chuck face 17.

As shown in FIG. 1A, the illustrated top right part of the cover 21 is formed with an exhaust port 22 for exhausting the gas in the exhaust chamber 31. Further, the outside of the cover 21 is provided with a valve 23 as a means for opening and closing the exhaust port 22.

The exhaust port 22 and eject port 32 form the exhaust passage in the present embodiment for exhausting the pressurized gas from the exhaust chamber 31 to the outside, while the valve 23 forms the exhaust path cross-sectional area adjusting means.

As shown in FIG. 2, the transport system 1 moves a workpiece 2 placed on for example a pallet 3 on to a treatment plate 4 for warming etc. and is provided with a cylinder system 5 moving the chuck 10 up and down and a cylinder system 6 for moving it horizontally (illustrated left-right direction).

One end of a conduit 92 comprised of a tube member having flexibility is connected to the chuck 10, while the other end of the conduit is connected to a pressurized gas feeding means comprised of a compressor 90. Inside the pressurized gas discharge route of the compressor 90 is arranged a filter member 91 for removing foreign matter etc. from the pressurized gas (in this embodiment, pressurized air). The chuck 10 is fed cleaned gas (air).

The control means comprised of the control system 100 is designed to output a signal for operating the cylinder systems 5 and 6 to control the position of the chuck 10 and a signal for controlling a not shown drive means of the valve 23 based on pressure information from the pressure sensor 16 in the chuck 10 (see FIGS. 1A and 1B), the positional information from the cylinder systems 5 and 6, etc.

Note that the workpiece 2 in the present embodiment is for example a small workpiece mounting an acceleration sensor chip (dimensions of chucked face of about 7 mm×7 mm). Even foreign matter of 0.5 μm deposited on it may cause a malfunction, so the entire transport system 1 is placed in a clean room having a cleanliness of class 100 or more.

Next, the operation of the chuck 10 of the transport system 1 of the present embodiment will be explained with reference to the above configuration.

Figure 3:
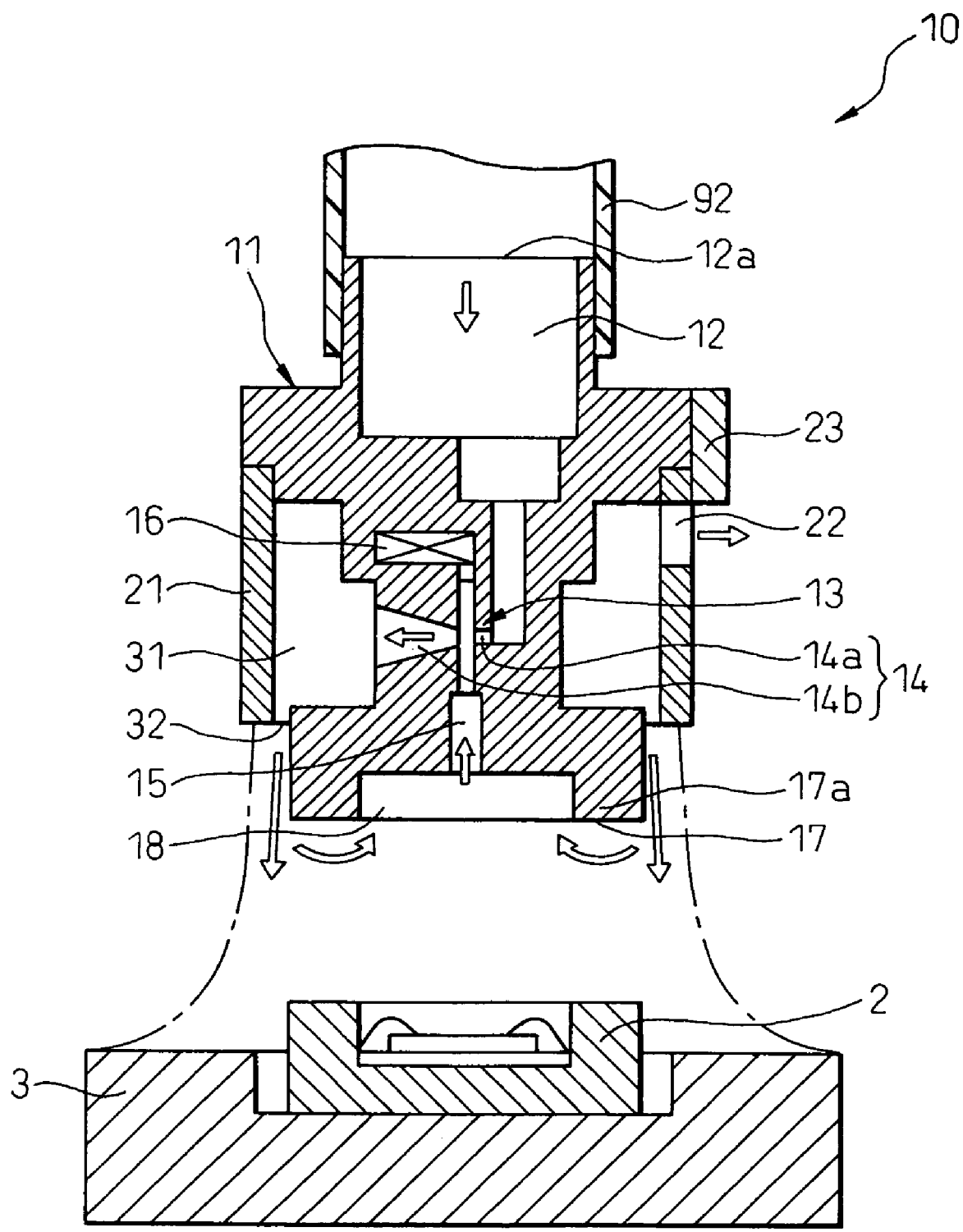
FIG. 3 is a view showing a state before the chuck chucks a workpiece (pre-chuck step A)
Figure 4:
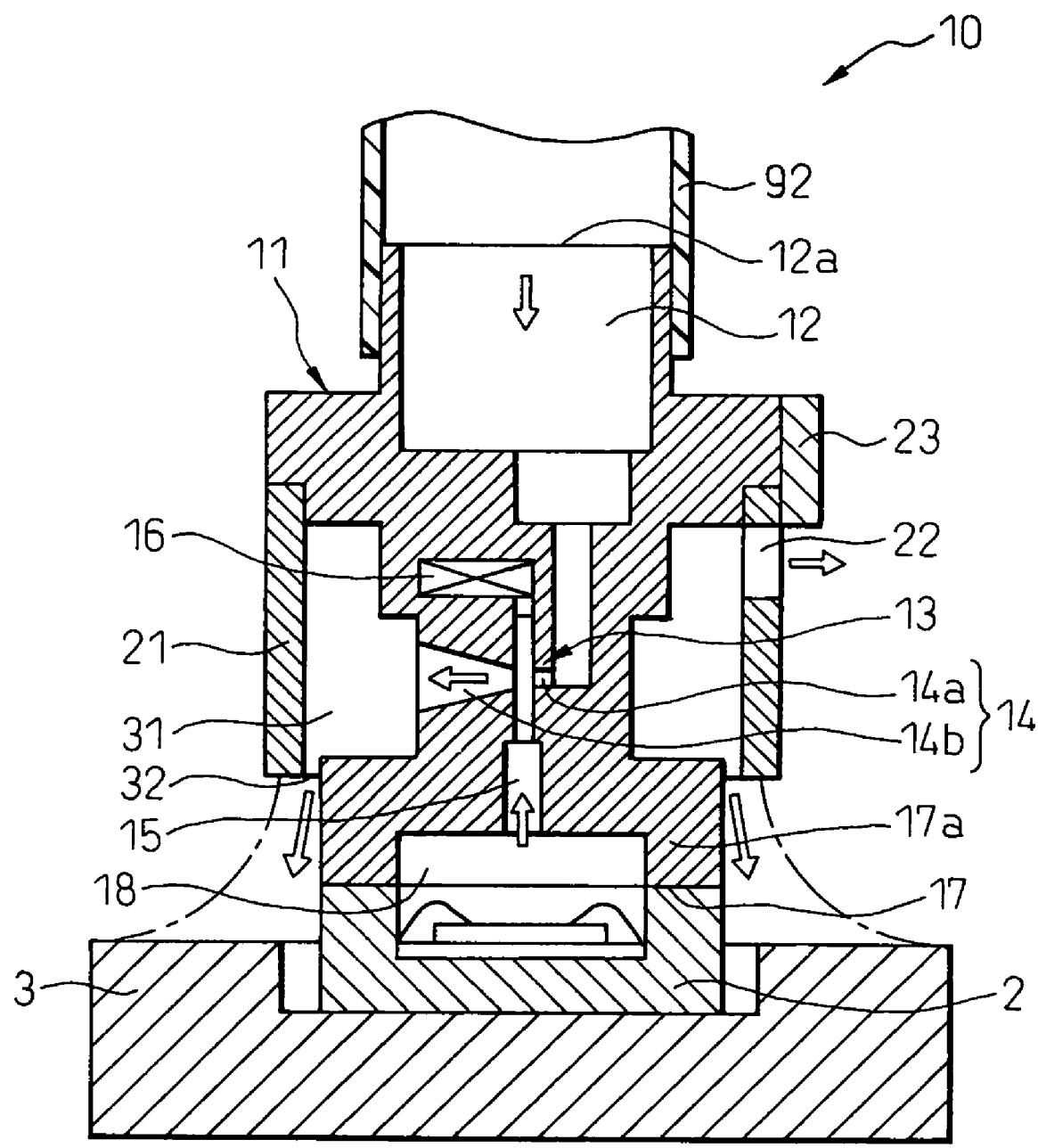
FIG. 4 is a view showing a chuck step B.
Figure 5:
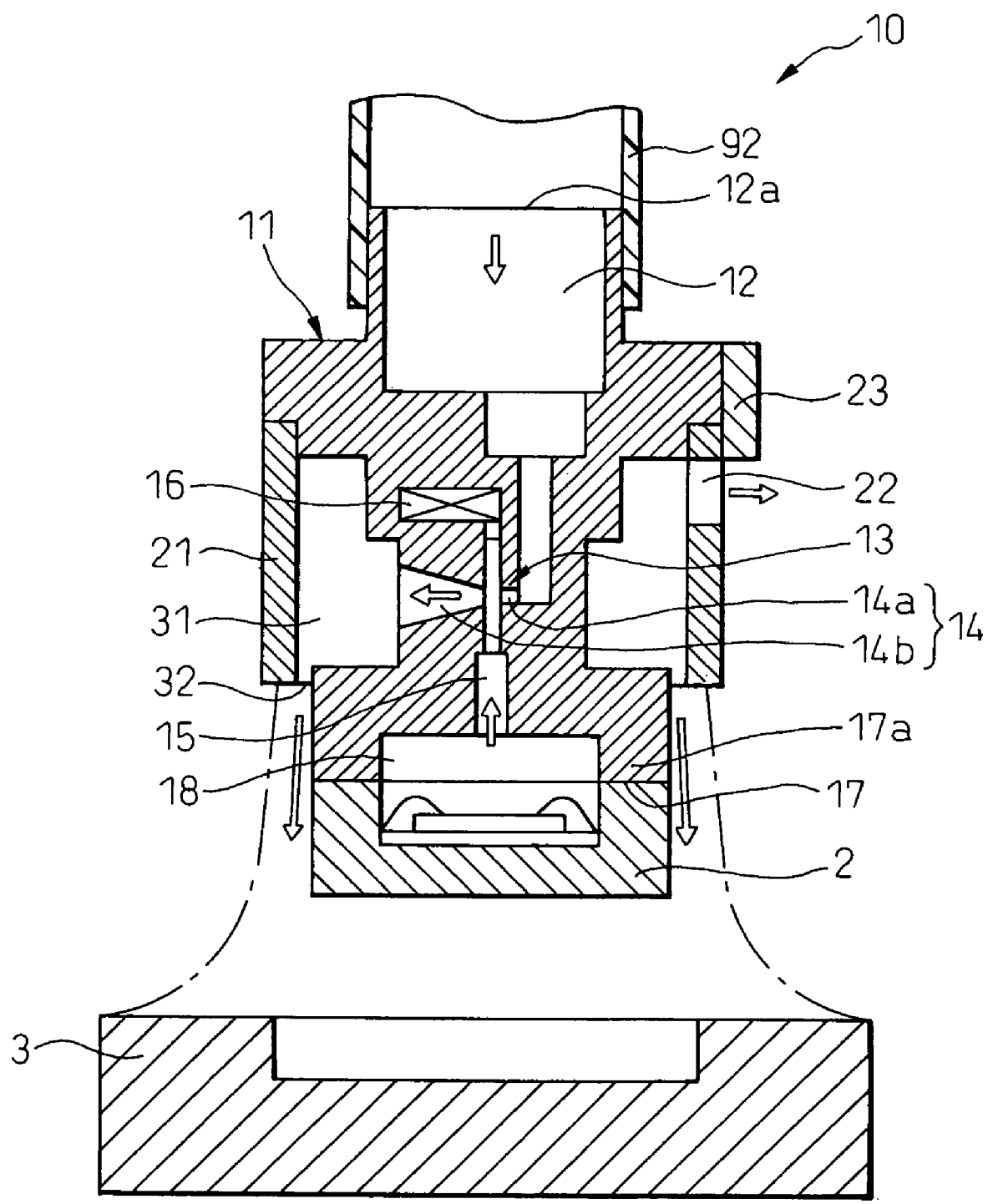
FIG. 5 is a view showing a movement step C.
Figure 6:
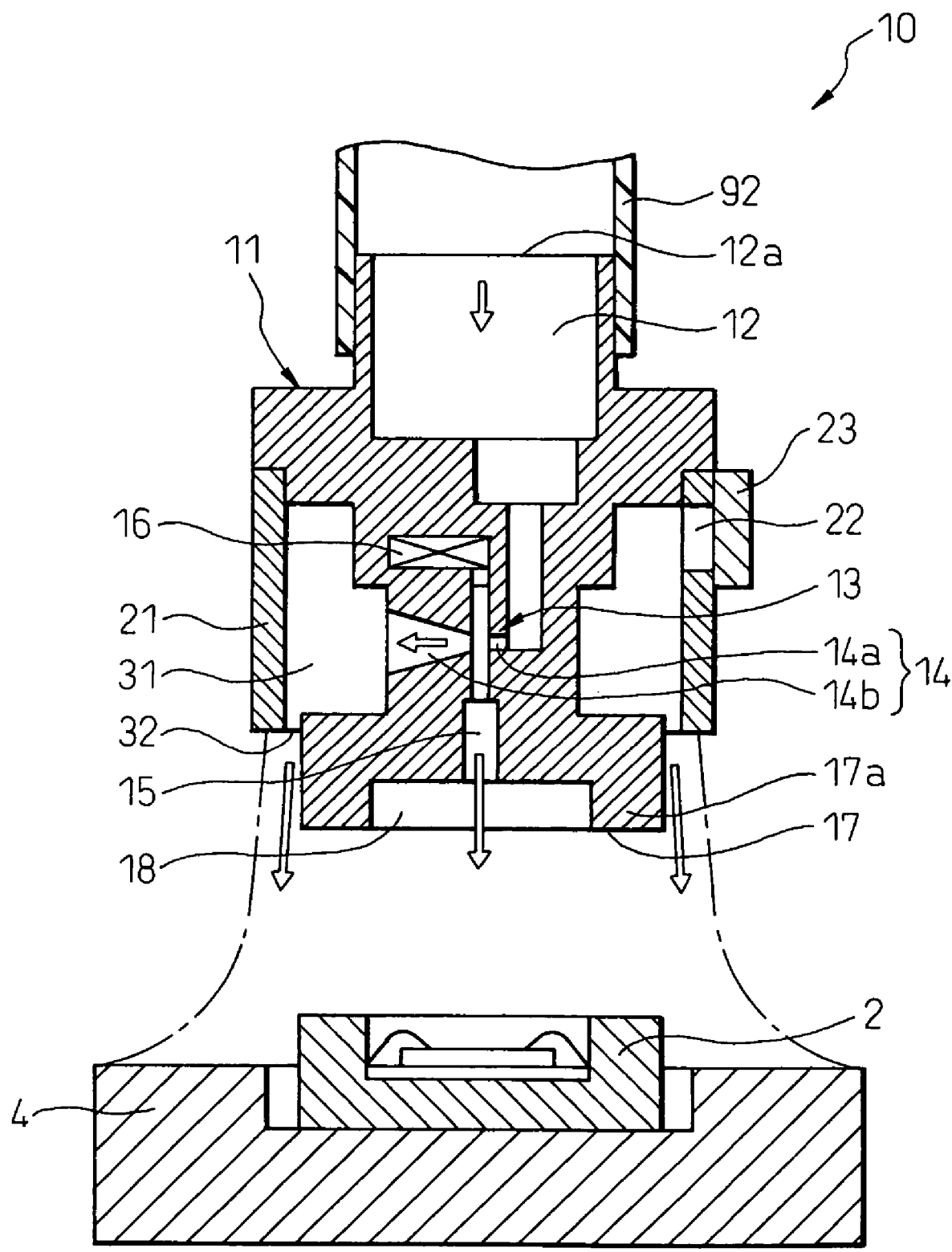
FIG. 6 is a view showing an unchuck step D.

FIG. 3 is a view of the state before the chuck 10 chucks a workpiece 2, FIG. 4 is a view showing a chuck step where the chuck 10 chucks a workpiece 2, FIG. 5 is a view showing a movement step where the chucked workpiece 2 is moved (corresponding to workpiece operating step in the present invention), and FIG. 6 is a view showing an unchuck step where the chuck 10 unchucks the workpiece 2.

FIG. 7A is a graph showing changes of the pressure inside the introduction passage 12 of the chuck 10 (fine solid line), the pressure in the exhaust chamber 31 (broken line), and the pressure in the suction chamber 18 (thick solid line, pressure sensor 16 detection pressure).

As shown in FIG. 7A, inside the introduction passage 12 of the chuck 10, a substantially constant pressure (about 250 kPa) is applied from the compressor 90 side. Cleaned pressurized air is constantly fed.

As shown in FIG. 3, before the chuck 10 chucks a workpiece 2 (at the pre-chuck step A), when the pressurized air introduced from the introduction port 12a to the inside of the introduction passage 12 passes through the nozzle 14 of the ejector unit 13, it sucks out the air inside the suction chamber 18 through the communication passage 15. At this time, the workpiece 2 is not in contact with the chuck face 17, but the inside of the suction chamber 18 becomes somewhat negative in pressure (about −10 kPa).

The pressurized air passing through the nozzle 14 is exhausted to the inside the exhaust chamber 31 along with the air flowing in from the suction chamber 18. Due to this, the inside of the exhaust chamber 31 becomes somewhat positive in pressure (about 10 to 20 kPa). Due to this pressure, the air inside the exhaust chamber 31 is exhausted from the exhaust port 22 opened by the valve 23 and is ejected in a curtain form from the eject port 32.

Part of the air ejected from the eject port 32 flows toward the workpiece 2 direction through the region between the illustrated two one-dot chain lines, while the remainder flows toward the somewhat negative pressure suction chamber 18 and is returned from the suction chamber 18 through the communication passage 15 to the nozzle 14.

That is, part of the cleaned air ejected from the eject port 32 circulates along the route from the suction chamber 18 to the communication passage 15 to the nozzle 14 (secondary nozzle 14b) to the exhaust chamber 31 and to the eject port 32. Therefore, even if there is foreign matter floating in a region outside the one-dot chain lines, that foreign matter will not be sucked in. In this way, it is possible to maintain the space between the chuck face 17 and the workpiece 2 in a clean state before chucking the workpiece 2.

The control system 100 drives the cylinder system 5 to make the chuck 10 descend from the state shown in FIG. 3. When the workpiece 2 abuts against the ring-shaped projection 17a of the chuck face 17, the chuck step B shown in FIG. 4 is shifted to. From the pre-chuck step A, a negative pressure state forming step, as referred to in the present invention, is performed for making the inside of the suction chamber 18 a negative pressure. An arranging step, as referred to in the present invention, for arranging the suction chamber 18 so as to contact the workpiece 2 is performed, then the chuck step B is shifted to.

When shifting to the chuck step B, the flow of the air ejected from the eject port 32 into the suction chamber 18 is stopped, so the suction action of the ejector unit 13, as shown in FIG. 7A, causes the pressure inside the suction chamber 18 to fall (the negative pressure to increase). Due to the pressure difference between the negative pressure inside the suction chamber 18 and the atmospheric pressure of the outside, the workpiece 2 is chucked (held by suction) at the chuck face 17 of the chuck 10.

The pressurized air passing through the nozzle 14 of the ejector unit 13 and exhausted to the exhaust chamber 31 is exhausted from the exhaust port 22 opened by the valve 23 and ejected in a curtain form from the eject port 32.

The air ejected from the eject port flows so as to surround the entire sides of the workpiece 2 (flows through the region between the one-dot chain lines) and can hold the space around the workpiece 2 in a clean state.

In this way, the workpiece 2 is chucked at the chuck face 17 of the chuck 10, then the movement step C shown in FIG. 5 is shifted to.

Here, in the chuck 10 of the present embodiment, the pressure of the pressurized air fed into the introduction passage 12 is about 250 kPa. When pressurized air is exhausted to the outside from the exhaust port 32 opened by the valve 23 and the eject port 32, the suction action of the ejector unit 13 causes the inside of the suction chamber 18 to reach about −40 kPa.

As explained above, the chuck 10 is provided with a pressure sensor 16 for detecting the pressure inside the suction chamber 18. Further, the control system 100 executes the movement step C outputting an operation signal to the cylinder systems 5 and 6 when the negative pressure detected by the pressure sensor 16 falls below a predetermined pressure.

The predetermined pressure for the control system 100 judging the timing of shifting from the chuck step B to the movement step C is set based on the weight of the workpiece 2 or the stress generated in the movement step C. That is, if the inside of the suction chamber 18 becomes a negative pressure of a predetermined pressure or less, the workpiece 2 can be stably held and moved.

Therefore, the control system 100 shifts from the chuck step B to the movement step C without waiting for the inside of the suction chamber 18 to reach −40 kPa when the negative pressure detected by the pressure sensor 16 reaches −30 kPa.

During execution of the movement step C, the suction action of the ejector unit 13, as shown in FIG. 7A, causes the inside the suction chamber 18 to maintain a substantially constant negative pressure. Due to the pressure difference between the negative pressure inside the suction chamber 18 and the atmospheric pressure of the outside, the workpiece 2 is held by suction at the chuck face 17 of the chuck 10.

The pressurized air passing through the nozzle 14 of the ejector unit 13 and exhausted to the exhaust chamber 31 is exhausted from the exhaust port 22 opened by the valve 23 and ejected in a curtain form from the eject port 32.

The air ejected from the eject port 32 flows so as to surround the entire region of the sides to the bottom face of the workpiece 2 (flows through the region between the one-dot chain lines) and can hold the space around the workpiece 2 in a clean state.

In this way, the workpiece 2 is chucked at the chuck face 17 of the chuck 10 and moved on top of the treatment plate 4 shown in FIG. 2, then the unchuck step D shown in FIG. 6 is shifted to.

Specifically, the control system 100 outputs a signal to a not shown driving means of the valve 23 to, as shown in FIG. 6, make the valve 23 close the exhaust port 22.

When the exhaust port 22 is closed, the only path of exhaust from the exhaust chamber 31 to the outside becomes the eject port 32. Due to this, the pressurized air introduced into the introduction passage 12, passing through the nozzle 14 of the ejector unit 13, and being exhausted to the exhaust chamber 31 raises the pressure inside the exhaust chamber 31.

Due to the rise in pressure in the exhaust chamber 31, the pressure in the exhaust chamber 31 approaches the pressure in the introduction passage 12 (the pressure difference between the inside of the exhaust chamber 31 and the inside of the introduction passage 12 is reduced). In the chuck 10 of this embodiment, as shown in FIG. 7A, the pressure inside the exhaust chamber 31 rises quickly to about 100 kPa.

If the pressure inside of the exhaust chamber 31 and the pressure inside of the introduction passage 12 approach each other, in other words, if the pressure at the upstream side of the nozzle 14 of the ejector unit 13 and the pressure at the downstream side approach each other, the suction action of the ejector unit 13 remarkably declines. Along with the decline of the suction action, the pressurized air flowing through the nozzle 14 enters the communication passage 15 and is ejected into the suction chamber 18.

Due to this, as shown in FIG. 7A, the inside of the suction chamber 18 quickly reaches a pressure of the atmospheric pressure or more (positive pressure). When the inside of the suction chamber 18 is pressurized to the atmospheric pressure or more, due to the pressure-difference between the pressure inside the suction chamber 18 and the atmospheric pressure of the outside, the workpiece 2 is quickly unchucked (released) from the chuck face 17 of the chuck 10 and placed on the treatment plate 4.

In the chuck 10 of the present embodiment, the areas of the opening of the exhaust port 22 and the eject port 32 are set so that the negative pressure state of the inside of the suction chamber 18 will not be lifted so long as the valve 23 closes the exhaust port 22.

Part of the pressurized air passing through the nozzle 14 of the ejector unit 13 is ejected through the exhaust chamber 31 from the eject port 32 in a curtain form. Further, the remainder is ejected through the communication passage 15 from the suction chamber 18.

The air ejected from the two paths to the outside flows so as to surround the entire region from the top face to the sides of the workpiece 2 (flows through region between one-dot chain lines) and can maintain the space between the chuck face 16 and the workpiece 2 in a clean state.

Here, while not shown in FIG. 7A, it is also possible to end the unchuck step D of the workpiece 2, then open the exhaust port 22 in preparation for the next chuck step B. Even if opening the exhaust port 22 in the state where the unchuck step D is ended, in the same way as the state shown in FIG. 3, part of the air ejected from the eject port 32 flows in the downward direction, while the remainder flows toward the suction chamber 18 and returns to the nozzle 14. Due to this, even after the workpiece 2 is unchucked, the space between the chuck face 17 and the workpiece 2 can be kept in a clean state.

The configuration comprised of the exhaust port 22 and the valve 23 forming the exhaust passage sectional area adjusting means may be said to be a pressure raising means for raising the pressure inside the exhaust chamber 31 and may be said to be a pressure approaching means for making the pressure of the pressurized air at the upstream side from the nozzle 13 and the pressure of the pressurized air at the downstream side from the nozzle 14 approach each other (pressure difference reducing means).

The configuration comprised of the exhaust port 22 and valve 23 may also be said to be a pressurized gas introducing means for introducing pressurized gas inside the suction chamber 18 and may also be said to be a pressurizing means for pressurizing the inside of the suction chamber 18 to the atmospheric pressure 18 or more.

According to the above configuration and operation, from before arranging the suction chamber 18 to contact the workpiece 2 at the chuck step B, pressurized air is circulated through the nozzle 14 of the ejector unit 13 to make the inside of the suction chamber 18 a negative pressure in state. Therefore, if arranging the suction chamber 18 so as to contact the workpiece 2, it is possible for the suction chamber 18 to quickly apply suction to the workpiece 2 and chuck the workpiece 2.

Further, when the negative pressure in the suction chamber 18 at the chuck step B becomes less than a predetermined pressure enabling the workpiece to be held at the next step, that is, the movement step (transport step) C, the routine shifts to the movement step C. Therefore, it is possible to shift to the movement step C without continuing the chuck step B any more than necessary.

Further, a small pressure sensor 16 for detecting the pressure inside the suction chamber 18 is provided at the end of the communication passage 15 close to the suction chamber 18, so the pressure detection response is good and the pressure can be detected with a good precision.

Further, in the unchuck step D, the inside of the suction chamber 18 is pressurized to the atmospheric pressure or more to quickly lift the negative pressure state of the suction chamber 18 and unchuck the workpiece 2.

Due to this, it is possible to shorten the time required for the chuck step B or the unchuck step D and reliably shorten the attachment/detachment time of the workpiece 2 by the chuck 10.

Figure 7B:
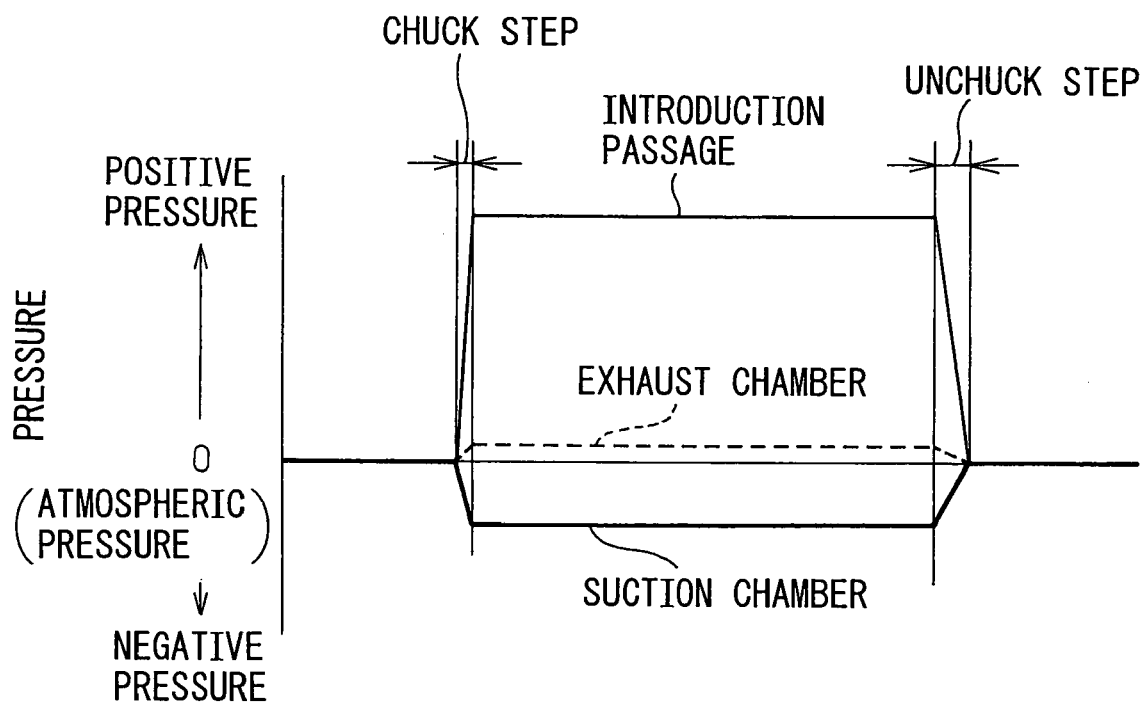
FIG. 7B is a graph showing pressure changes of different parts of a conventional chuck.

FIG. 7B is a graph showing an example of changes in pressure of different parts when holding a workpiece according to the related art in a manner corresponding to the present embodiment.

In the related art, when chucking a workpiece, the suction chamber is arranged so as to contact the workpiece, then pressurized air is circulated through the nozzle to make the inside of the suction chamber a negative pressure. Further, when unchucking the workpiece, air is made to flow from the nozzle, through which pressurized air is no longer circulated, through the communication passage to the inside of the suction chamber so as to lift the negative pressure state inside the suction chamber.

Therefore, the chuck step and the unchuck step required a long time (for example, about 1 second each).

As opposed to this, the inventors confirmed that, according to the present embodiment to which the present invention is applied, it is possible to reduce the time required for the chuck step and the unchuck step to $\frac{1}{10}$ to $\frac{1}{20}$ that of the past (for example, 0.05 to 0.1 second).

Further, a so-called vacuum chuck has been used since the past for making the inside of the suction chamber a negative pressure by a vacuum pump or other negative pressure source.

However, this chuck system continues to suck in the air around the workpiece at the time of chucking the workpiece and the time of transporting it, so foreign matter around the workpiece easily deposits in the vacuum piping. Further, to unchuck the workpiece after moving it to a predetermined position, it is necessary to open the inside of the vacuum piping to the atmospheric pressure, while to detach the workpiece from the workpiece face, it is necessary to supply high pressure gas. This being so, foreign matter deposited in the piping ends up being blown to the workpiece by the high pressure gas.

By repeating these chuck and unchuck steps, even if performing the assembly work in a class 100 environment, there was the problem of deposition of foreign matter on the workpiece in some cases. Further, even when transporting fine workpieces, a vacuum piping volume having a volume exceeding the suction chamber provided on the chuck face is reduced in pressure, so there was the problem of the chucking taking time.

As opposed to this, according to the present embodiment to which the present invention is applied, it is possible to reliably prevent deposition of foreign matter on to the workpiece and greatly shorten the item required for chucking and unchucking.

Further, in the unchuck step D, by the simple operation of closing the exhaust port 22, the exhaust path sectional area of the pressurized air from the exhaust chamber 31 to the outside is reduced to raise the inside of the exhaust chamber 31 in pressure and the pressure difference between the upstream and downstream sides of the nozzle 14 is reduced.

Due to this, it is possible to reduce the flow rate of the pressurized air circulating through the nozzle 14, reduce the suction force of the ejector unit 13, and introduce pressurized air from the nozzle 14 to the inside of the suction chamber 18 so as to pressurize the inside of the suction chamber 18 to the atmospheric pressure or more.

According to this, it is possible to utilize the pressurized air circulating through the nozzle 14 to pressurize the inside of the suction chamber 18. Therefore, there is no need to provide a configuration for introducing other high pressure gas to pressurize the inside of the suction chamber 18 and therefore the chuck 10 can be made smaller in size. Further, there is no need to switch between the feeding of pressurized air and cessation of the feed.

Further, when the chuck 10 holds a workpiece 2 at the chuck face 17, cleaned pressurized air may be ejected from the eject port 32 so as to surround the workpiece 2 to prevent foreign matter etc. from depositing on the workpiece 2.

Further, when the chuck face 17 of the chuck 10 and the workpiece 2 are separated, cleaned pressurized air may be ejected from the eject port 32 toward the circumference of the workpiece 2, part of the ejected cleaned air may be returned via the suction chamber 18, and therefore the cleanliness of the gas ejected from the eject port 32 can be maintained.

Due to this, even if the chuck 10 does not hold a workpiece 2, foreign matter etc. can be prevented from depositing on the workpiece 2.

Further, the chuck 10 of the present embodiment employs a relatively small suction chamber 18 corresponding to the small workpiece 2. Since the area to be given suction is small, the ejector unit 13 is provided with a single nozzle 14. That is, there is a single outlet of the nozzle 14 (secondary nozzle 14b) to the exhaust chamber 31.

Therefore, in the present embodiment, the cross-sectional area of the exhaust chamber 31 in the circumferential direction is secured relatively large and the air circulation resistance in the exhaust chamber 31 in the circumferential direction is made smaller than the air ejection resistance from the eject port 32. Due to this, even if there is just a single nozzle 14, it is possible to eject cleaned air substantially uniformly from the ring-shaped eject port 32.

Other Embodiments

In the above embodiment, to shorten the work attachment/detachment time, a negative pressure state is formed in the suction chamber 18 from before the chuck step; when the inside of the suction chamber 18 falls below a predetermined pressure in the chuck step, the movement step is shifted to; and, in the unchuck step, the inside of the suction chamber 18 is pressurized to the atmospheric pressure or more, but these need not be all employed. If using some of these, it is possible to obtain the effect of shortening the attachment/detachment time of the workpiece.

Further, in the above embodiment, to pressurize the inside of the suction chamber 18 to the atmospheric pressure or more in the unchuck step, the valve 23 was operated to close the exhaust port 22 and raise the pressure inside the exhaust chamber 31, but the invention is not limited to this. It is also possible to employ the other method of reducing the cross-sectional area of the pressurized gas exhaust path from the exhaust chamber 31 to raise the pressure inside the exhaust chamber 31.

For example, as shown in FIG. 8, it is also possible to close the exhaust port 23 by a closing member provided 23A corresponding to the position for the unchuck step (in this example, a fixing member projecting from the treatment plate 4).

Figure 9:
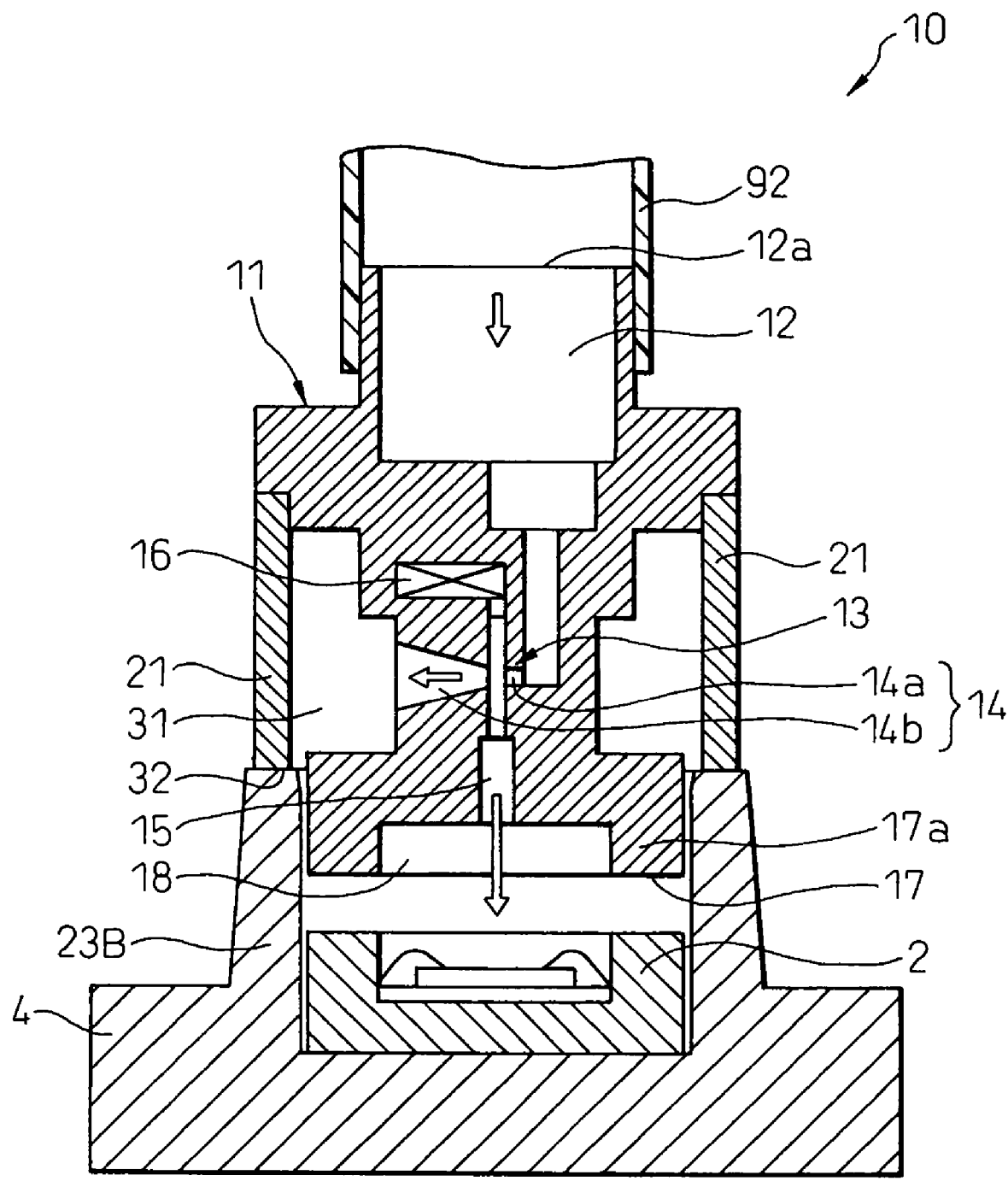
FIG. 9 is a view of the unchuck step in another embodiment.

Further, as shown in FIG. 9, it is also possible to close part or all of the eject port 32 by a closing member 23B provided corresponding to the position for the unchuck step (in this example, a ring-shaped wall member projecting from the treatment plate 4).

Further, to pressurize the inside of the suction chamber 18 to the atmospheric pressure or more in the unchuck step, it is also possible to directly introduce pressurized gas from the compressor 90 or pressurized gas from another system to pressurize the inside of the exhaust chamber 31 to raise the pressure at the inside of the exhaust chamber 31.

Further, the pressure of the pressurized gas supplied from the compressor 90 may be raised only at the time of unchucking so as to make the upstream side pressure and downstream side pressure of the nozzle 14 approach each other.

Further, it is also possible to directly introduce pressurized gas from the compressor 90 or pressurized gas from another system to pressurize the inside of the suction chamber 18 to the atmospheric pressure or more.

Further, if an air curtain ejected from an eject port 32 is not required, it is also possible to not provide the cover (not form the exhaust chamber) and to reduce the outlet area of the nozzle 14 (secondary nozzle 14b) at the time of unchucking and introduce pressurized gas into the suction chamber 18.

Further, in the above embodiment, a single chuck 10 was used to chuck a single workpiece 2 by a single suction chamber 18, but the invention is not limited to this.

Figure 10:
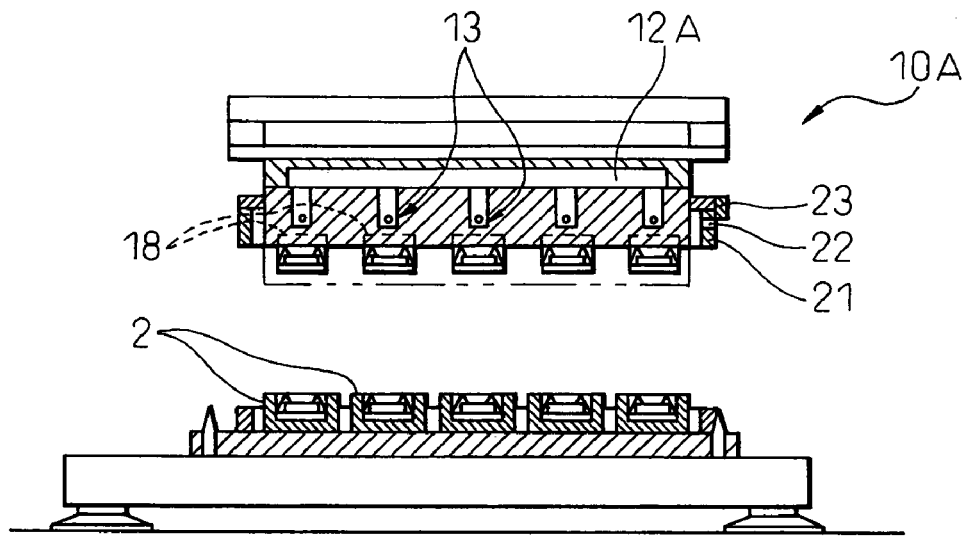
FIG. 10 is a view of the chuck step in another embodiment.

For example, as shown in FIG. 10, it is also possible to employ a chuck 10A provided with a plurality of suction chambers 18 and chuck workpieces 2 at these suction chambers 18. According to this example, it is possible to feed pressurized gas to the plurality of ejector units 13 corresponding to the plurality of suction chambers 18 from a common introduction passage 12A.

Further, it is possible to simultaneously chuck a plurality of workpieces 2 and use switching control of the common exhaust port 22 for the plurality of suction chambers 18 to simultaneously unchuck a plurality of workpieces 2. Note that in this example, it is also possible to chuck workpieces 2 by just some of the suction chambers 18.

Further, if employing a configuration enabling pressures at the outlet sides of the ejector units 13 to be individually raised in the chuck 10A illustrated in FIG. 10, it is possible to offset the timings of unchucking the plurality of workpieces 2.

Figure 11:
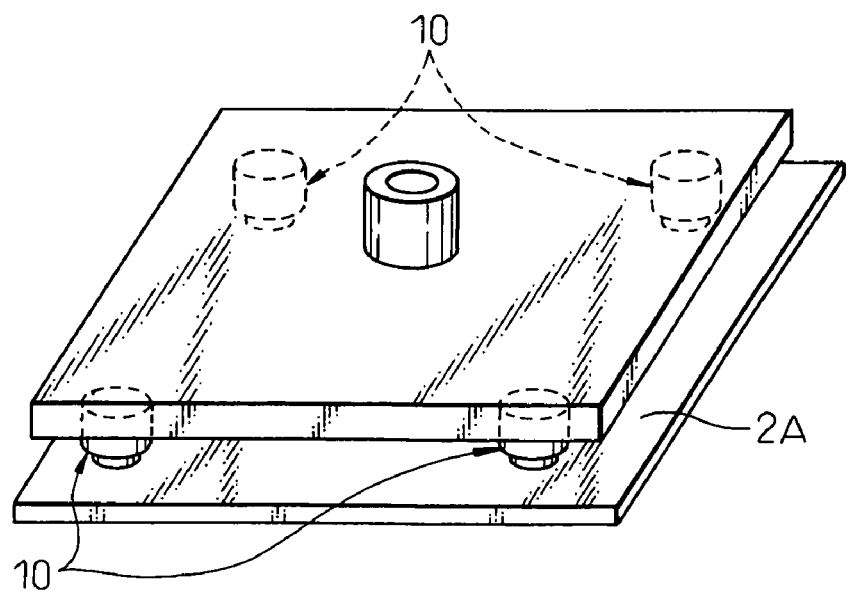
FIG. 11 is a view of the chuck step in another embodiment.

Further, as shown in FIG. 11, a plurality of chucks 10 may also be used to hold a single relatively large workpiece (for example, a wafer, glass substrate, etc.) 2A.

Further, in the above embodiment, the chuck 10 was comprised by a block member 11 and a cover 21, that is, two members, but it may also be comprised of one or three or more members.

Further, in the above embodiment, pressurized gas was supplied to the nozzle 14 of the ejector unit 13 to reduce the pressure inside the suction chamber 18 (make them a negative pressure), but if a desired negative pressure state can be formed in the suction chamber 18, it is also possible to employ not an ejector mechanism, but a so-called aspirator mechanism to suck in the gas in the suction chamber.

Further, in the above embodiment, the only workpiece operating step was the step of moving the workpiece (transport step), but the invention is not limited to this. For example, the workpiece operating step may also be a step of treating or working the workpiece. The present invention is also effective when applied to the chuck step and unchuck step before and after the step of inspecting a workpiece.

While the invention has been described with reference to specific embodiments chosen for purpose of illustration, it should be apparent that numerous modifications could be made thereto by those skilled in the art without departing from the basic concept and scope of the invention.

The invention claimed is:

1. A method of picking and placing a workpiece, the method comprising:
   providing a chuck having a block member defining a chuck face, a nozzle, an introduction passage in communication with said nozzle, a suction passage and a communication passage in communication with said suction passage and said nozzle;
   chucking a workpiece with said chuck;
   performing an operation on the workpiece after the chucking step; and
   unchucking said workpiece after said performing step,
   said chucking step includes simultaneously arranging the chuck face to contact said workpiece such that said suction chamber communicates with said workpiece and circulating positively pressurized gas from said introduction passage through said nozzle to suck out gas from inside said suction chamber through said communication passage and making said suction chamber a negative pressure to apply suction to said workpiece to thereby chuck said workpiece,
   said unchucking step lifting said negative pressure state of said suction chamber and unchucking said workpiece,
   said circulating of positively pressurized gas from said introduction passage through said nozzle being started before said arranging of the chuck face to contact said workpiece; wherein
   said positively pressurized gas is cleaned gas, and
   said chucking step ejects said positively pressurized gas after passing through said nozzle to surround a circumference of said workpiece.

2. The method as set forth in claim 1, further comprising, before starting said chucking step, returning said ejected positively pressurized gas through said suction chamber to said nozzle.

3. The method as set forth in claim 1, further comprising, after ending said unchucking step, returning said ejected positively pressurized gas through said suction chamber to said nozzle.

4. A method of picking and placing a workpiece, the method comprising:
   providing a chuck having a block member defining a chuck face, a nozzle, an introduction passage in communication with said nozzle, a suction passage and a communication passage in communication with said suction passage and said nozzle;
   chucking a workpiece with the chuck;
   performing an operation on the workpiece after the chucking step; and
   unchucking said workpiece after said performing step;
   said chucking step includes simultaneously arranging the chuck face to contact said workpiece such that said suction chamber communicates with said workpiece and circulating positively pressurized gas from said introduction passage through said nozzle to suck out gas from inside said suction chamber with said nozzle and making said suction chamber a negative pressure to apply suction to said workpiece to thereby chuck said workpiece;
   said unchucking step lifting said negative pressure state of said suction chamber and unchucking said workpiece;
   said circulating of positively pressurized gas from said introduction passage through said nozzle being started before said arranging of the chuck face to contact said workpiece; wherein
   said unchucking step pressurizes said suction chamber to atmospheric pressure and more;
   said unchucking step introduces said positively pressurized gas to said suction chamber through said communication passage to pressurize said suction chamber to said atmospheric pressure or more; and
   said unchucking step includes increasing a pressure of said positively pressurized gas at a downstream side of said nozzle and introducing said positively pressurized gas from said nozzle through said communication passage to said suction chamber.

5. The method as set forth in claim 4, further comprising shifting said workpiece to said performing step after the negative pressure inside said suction chamber falls below a predetermined negative pressure.

6. The method as set forth in claim 4, wherein such unchucking step raises the pressure of an exhaust chamber of said positively pressurized gas provided at a downstream side of said nozzle to make the pressure of said positively pressurized gas at the upstream side of said nozzle and the pressure of said pressurized gas at the downstream side of said nozzle approach each other.

7. The method as set forth in claim 6, wherein said unchucking step reduces a cross-sectional area of an exhaust path of said positively pressurized gas from said exhaust chamber to the outside to raise the pressure inside said exhaust chamber.

8. The method as set forth in claim 7, wherein
   said positively pressurized gas is cleaned gas, and
   said chucking step ejects said positively pressurized gas after passing through said nozzle to surround a circumference of said workpiece.

9. The method as set forth in claim 8, further comprising, before starting said chucking step, returning said ejected positively pressurized gas through said suction chamber to said nozzle.

10. The method as set forth in claim 8, further comprising, after ending said unchucking step, returning said ejected positively pressurized gas through said suction chamber to said nozzle.

* * * * *

UNITED STATES PATENT AND TRADEMARK OFFICE
CERTIFICATE OF CORRECTION

PATENT NO. : 7,603,767 B2  Page 1 of 1
APPLICATION NO. : 11/439418
DATED : October 20, 2009
INVENTOR(S) : Goko et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 488 days.

Signed and Sealed this

Fifth Day of October, 2010

David J. Kappos
*Director of the United States Patent and Trademark Office*